Aug. 22, 1944.     P. F. SMITH     2,356,493
PARACHUTE
Filed Feb. 25, 1942

INVENTOR.
PREVOST F. SMITH.
BY  Albert Sperry.
ATTORNEY

Patented Aug. 22, 1944

2,356,493

UNITED STATES PATENT OFFICE 2,356,493

PARACHUTE

Prevost F. Smith, Manchester, Conn., assignor to Pioneer Parachute Company, Inc., Manchester, Conn., a corporation of Connecticut Application February 25, 1942, Serial No. 432,213

11 Claims. (Cl. 244—145)

My invention relates to parachutes and methods of producing the same and particularly to constructions whereby strains placed upon the fabric of which the parachute canopy is formed are materially reduced.

Parachutes as heretofore constructed have generally been of the flat type in which the fabric of the canopy when fully and smoothly extended has a circular form with a vent in the center. The suspension lines of the parachute are secured to the canopy along radially extending seams joining the sections of the fabric so that the fabric between the suspension lines is fully extended. When the parachute is in use the suspension lines pull the edges of the skirt downward and inward but the central portion of the canopy extends outward from the peak in a nearly flat form stretching the fabric taut between the suspension lines. This flatness of the central portion of the canopy is particularly pronounced during shock loading of the canopy. The impact and pressure of air against the taut fabric adjacent the peak of the canopy places very severe strains on the fabric and as a result tearing of the canopy almost always starts at a point adjacent the peak or in the central portion of the canopy.

So far as I am aware no one heretofore has made any provision for insuring looseness of the fabric adjacent the peak or central portion of the canopy when the parachute is in use. Some attempts have been made heretofore to relieve the strains placed upon the fabric by cutting the material on the bias in forming the sections of the canopy. It has also been proposed to form the fabric in sections with transversely extending seams to reinforce the fabric in a direction transverse to the suspension lines. Moreover, it has been common practice in the art to form the suspension lines shorter than the edges of the sections so as to pucker the fabric radially and provide for stretching of the suspension lines when they are subjected to the tensions incident to use of the parachute. However, in none of these cases has there been any reduction in the strains extending circumferentially of the canopy and transverse to the suspension lines. Therefore, even in those cases in which the fabric is loose in a direction extending radially of the canopy the transverse strains on the fabric draw the fabric taut between the suspension lines, especially at the center of the canopy where the canopy is substantially flat or only slightly arched. For this reason the loose fabric can only assume a corrugated form instead of the outwardly bellied or cup-shaped form desired and but little or no reduction in the strains on the fabric is effected.

In order to overcome these objections to constructions of the prior art and insure reduction in the strains on the fabric of the canopy, I provide means whereby the fabric of the canopy is maintained in a loose yieldable condition both radially and circumferentially of the canopy so that the fabric adjacent the peak of the canopy and between the suspension lines can belly upward and outward materially reducing the strains thereon.

Because of the reduction in strain upon the fabric parachutes embodying my invention may carry heavier loads and be used at higher speeds than heretofore without reducing the safety of the construction. In the alternative the parachute can be made of lighter and weaker fabric than could be used in conventional parachutes of the prior art. Furthermore, the transverse or diagonally extending seams which are usually formed in the various sections of the canopy may be eliminated and the time and work required to construct the parachute may be materially reduced. The material generally used in forming the seams is also saved so that it is possible to make a cheaper and lighter weight parachute without sacrifice in the great safety factor required in such constructions.

In carrying out my invention the canopy of the parachute is provided with restraining means which positively prevent the fabric between the suspension lines from spreading laterally to a fully extended position. In the preferred form of my invention the suspension lines serve as the restraining means and for this purpose they are passed completely over the canopy of the parachute and diametrically across the vent in the peak of the canopy. The portions of the canopy adjacent opposite edges of the vent are secured to the suspension lines at points thereon spaced apart a distance which is less than the expanded diameter of the vent so that the vent cannot be opened to its full diameter. The fabric adjacent the peak of the canopy is therefore held in a loose condition circumferentially of the canopy and may belly upward and outward between the suspension lines when the parachute is in use.

The suspension lines preferably also are connected to the canopy at points adjacent the vent and skirt which are spaced apart a distance substantially less than the extended length of the fabric so as to hold it in a puckered condition even when the suspension lines are subjected to the maximum tension incident to use of the parachute and corresponding to shock loading of the canopy. In this way both radially and circumferentially directed strains upon the fabric are reduced so that it can belly outward readily and accommodate itself to the forces applied thereto.

In order to avoid localized strains in the fabric at points spaced from the vent and yet near the central portion of the canopy I prefer to form the canopy so that it will have a conical shape when the fabric is fully extended. However, the attachment of the suspension lines to the canopy to provide a restricted vent and puckered radially extending seams serves to cause the canopy to lie flat when the suspension lines are secured thereto.

One of the objects of my invention is to provide a novel type of parachute which is simple and economical to produce and one which has a high safety factor.

Another object of my invention is to reduce the cost and time required for producing parachutes.

A further object of my invention is to provide a parachute with a canopy and suspension lines in which the fabric between the suspension lines is held in a loose condition when the parachute is in use.

Another object of my invention is to reduce the radially and circumferentially directed strains upon the fabric of a parachute canopy.

Still another object of my invention is to provide novel methods of producing parachutes.

These and other objects and features of my invention will appear from the following description thereof in which reference is made to the figures of the accompanying drawing.

Figure 1:
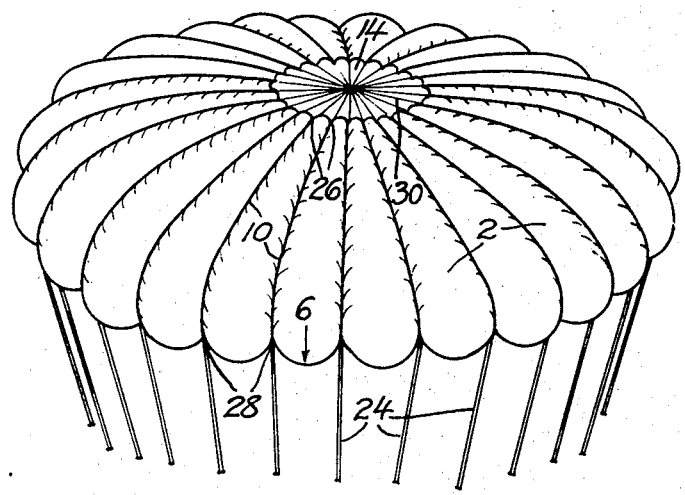
Fig. 1 is a perspective of a typical form of parachute canopy and suspension lines embodying my invention.
Figure 2:
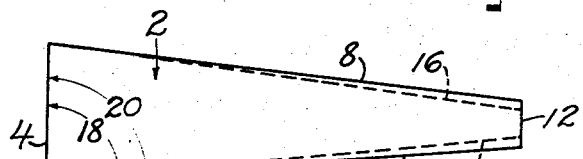
Fig. 2 is a plan view of a section of fabric used in forming the canopy of the parachute shown in Fig. 1.

In constructing a parachute of the type illustrated in Fig. 1 the canopy is formed of a plurality of sections of fabric 2 which preferably have the shape indicated by Fig. 2. Each section has a base or outer edge 4 designed to form a portion of the skirt 6 of the canopy and has inclined sides 8 which extend radially of the canopy and are used in forming seams 10 for joining the sections of the canopy together. The inner end or edge 12 of the section 2 is located adjacent the vent 14 in the peak of the canopy and is of greater width than the corresponding edge of those sections used in forming the usual flat type of parachute. The shape of such conventional sections is indicated by the dotted lines 16 in Fig. 2. As pointed out hereafter these lines also indicate the positions of the sides 8 of the section after the suspension lines have been secured to the canopy.

Figure 3:
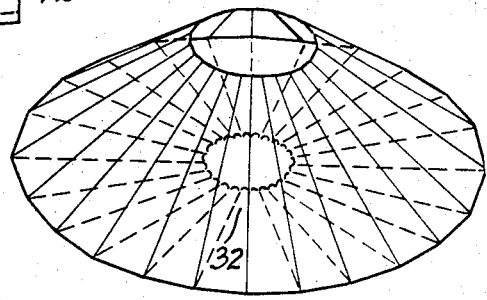
Fig. 3 is a diagrammatic perspective of a parachute canopy embodying my invention.
Figure 4:
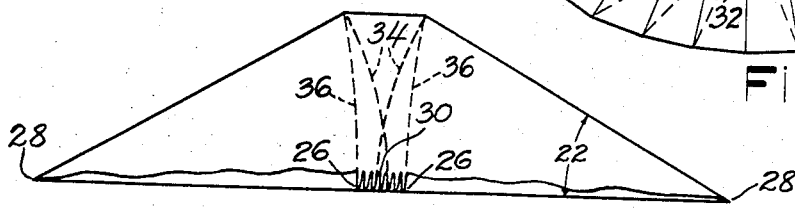
Fig. 4 is a vertical section view through the construction shown in Fig. 3.

Because of the extended width of the inner edge 12 of the section the sides 8 form angles 18 with the base 4 of the section which are greater than the angles 20 formed by the radii of a circle of corresponding diameter. The canopy formed by joining the sections 2 together therefore has a generally conical shape when the fabric is fully and evenly extended as indicated in Figs. 3 and 4.

The extended diameter of the vent in a typical parachute embodying my invention and having a diameter of 24 feet may be approximately 30 inches. The slope of the surface of the canopy when in the extended position of Figs. 3 and 4 is indicated by the angle 22 and is approximately 30 degrees, but this angle may be varied greatly without departing from the spirit and scope of my invention.

The suspension lines 24 are secured to the canopy of the parachute and preferably extend through and along the seams 10 which join the sections of the canopy together. The lines preferably also extend diametrically over the canopy and across the vent 14 and are secured to the canopy at the points 26 adjacent the vent and at the points 28 adjacent the skirt of the canopy. The length of that portion 30 of the suspension line extending across the vent is substantially less than the extended diameter of the vent and in a typical instance if the extended diameter of the vent is 30 inches the portion 30 may be only 18 inches in length. The suspension lines thus act as positive restraining means which prevent the vent from extending to its full diameter and hold the vent in so that the fabric between the suspension lines and along the inner ends 12 of the sections will be held in a loose condition so that it may belly upward and outward relieving the fabric of transverse or circumferentially directed strains.

In order further to reduce the strains to which the fabric of the canopy is subjected the distance between the points 26 on the suspension lines adjacent the vent 14 and the points 28 on the suspension lines adjacent the skirt 6 of the canopy is made substantially less than the extended length of the fabric along the sides 8 of the sections of the canopy. It is well known that the suspension lines usually employed in parachutes tend to stretch when subjected to tension when the parachute is in use. However, in accordance with my invention the distance between the points 26 and 28 is materially less than that required to allow for stretch of the suspension lines. Thus if the suspension lines normally increase in length from 2% to 4% when subjected to the tensions incident to operation of the parachute, the distance between the points 26 and 28 on the suspension lines may, for example, be 10% less than the extended length of the fabric along the edges 8 of the sections of the canopy.

When so constructed the suspension lines hold the fabric of the canopy so that it is puckered or loose throughout the length of the sections and also hold it so that it is loose radially of the canopy. The taut condition of the fabric which has given rise to tearing and fatal descents or "streamers" heretofore is thus eliminated and the fabric is free to give or yield to accommodate itself to the pressures applied thereto in use without being stretched in any direction by the suspension lines. This also reduces slippage of the fabric at the seams which has been a major fault in parachutes as heretofore constructed.

In constructions such as that shown and described in the copending application of Floyd Smith Serial No. 412,207, filed September 25, 1941, wherein the vent ring or hem about the vent contains elastic means for reducing the area of the vent after shock loading of the canopy, or in which a break strip is used to prevent or retard initial opening of the vent, the suspension lines or other positive restricting means used are so formed as to prevent the vent from opening to its fully extended diameter even when the elastic yields or the break strip is ruptured. The fabric about the vent is thus prevented from being stretched to render it taut at any time and the strains to which the fabric is subjected, even on shock loading of the parachute, are reduced to a minimum.

In forming parachutes embodying my invention the sections of fabric are stitched together to form a conical canopy as shown in Figs. 3 and 4. Because of the reduced strains on the material the sections may be formed of continuous pieces of fabric without any transverse seams whatever. However, it will of course be understood, that the fabric may be cut on the bias and the sections, if desired, may be formed of several smaller pieces of fabric as in the usual practice of parachute manufacture. By forming the sections in one piece, or in a smaller number than heretofore, the material used in forming transverse seams is saved and this saving exceeds the amount of cloth used to form the wider panels of Fig. 2. Moreover, the seam employed may be made narrower and the reduction in strains on the fabric renders it possible to secure the seam with only two rows of stitches instead of the usual four rows. The time and labor required to make the parachute is thus reduced.

After the sections have been stitched together to form the canopy, the suspension lines are marked to indicate the length of the portion 30 extending across the vent and to indicate the points 26 and 28 which are to be located adjacent the vent and skirt of the canopy. The suspension lines are then passed through the seams 10 on one side of the canopy, across the vent and through the diametrically opposite seam in the canopy. Thereafter the fabric of the seam is stitched to the suspension line whereby the canopy is drawn down to the flat form indicated at 32 in Fig. 3 and the fabric between and along the suspension lines is loose or puckered. As shown in Fig. 4 the fabric adjacent the opposite sides of the vent would overlap if it were kept fully extended and drawn downward in an arc as indicated at 34. However, by securing the suspension lines to the canopy as described with the desired radial shortening and puckering of the fabric, the edges of the vent are brought down to the positions shown at 26 in Fig. 3 and as indicated by the arcs 36 in Fig. 4. Moreover, this result is attained without increasing the diameter of the canopy and without providing any undesired fullness adjacent the skirt, where the fabric naturally bellys outward due to the drawing in of the suspension lines.

Figure 5:
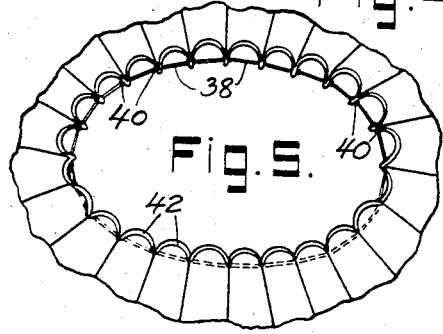
Fig. 5 is a perspective of a portion of a parachute canopy embodying an alternative form of my invention.

While I have shown and described the preferred form of my invention as using the suspension lines as the restraining means about the vent, other forms of restraining means may be used as exemplified by Fig. 5 wherein the strong restraining cord or strip 38 extends about the vent and passes through grommets 40 secured to the webbing 42 about the edge of the vent. The length of the cord 38 is substantially less than the expanded circumference of the vent and therefore insures looseness of the fabric between the suspension lines.

These and other modifications and changes may be made in the form and construction of parachutes embodying my invention and the features thereof may be embodied in other types of parachutes and in parachutes embodying other inventive features without departing from the spirit and scope of the invention as defined by the following claims.

I claim:

1. A parachute having a canopy with a vent in the peak thereof, and suspension lines secured to the material of which the canopy is formed and extending diametrically across the vent, the length of the portion of the suspension lines extending across the vent being less than the maximum expanded diameter of the vent, whereby the suspension lines positively prevent expansion of the vent to its full diameter and reduce the lateral strains to which the material of the canopy adjacent the vent is subjected.

2. A parachute having a canopy with a vent in the top thereof, and suspension lines extending diametrically across the canopy and vent and secured to the material of which the canopy is formed adjacent the vent and skirt thereof, the length of the line secured to the canopy being less than the expanded length of the material to which it is secured and the length of the line extending across the vent being less than the expanded diameter of the vent, whereby the material between the suspension lines is held in a loose condition when the parachute is in use and radially and laterally directed strains on the material are reduced.

3. A parachute having a fabric canopy and radially extending suspension lines secured thereto, the extended dimensions in both radial and transverse directions of the fabric between adjacent suspension lines exceeding the corresponding dimensions of the sector of the surface defined by said suspension lines when the parachute is in use, whereby the fabric is maintained in a loose condition when the parachute is in use.

4. A parachute having a canopy formed of a plurality of sections of fabric in the form of sectors of a conical surface secured together by radially extending seams, said canopy having a vent in the peak thereof and suspension lines secured to said fabric along said seams and extending across said vent, the length of the portion of the suspension line extending across the vent being less than the extended diameter of the vent, and the distance between the points on the suspension lines adjacent the edge of the skirt and the edge of the vent being substantially less than the extended length of said seams, whereby the fabric is kept loose when the parachute is in use and radially and laterally directed strains thereon are reduced.

5. A parachute having a canopy with a plurality of elements extending radially of the canopy and secured to the material of which the canopy is formed, the extended dimensions in both radial and transverse directions of the material between adjacent elements exceeding the corresponding dimensions of the sector of the surface defined by said elements when the parachute is in use, whereby said material is maintained in a loose condition when the parachute is in use.

6. A parachute having a canopy with a vent therein, means connected to the material of which the canopy is formed and extending radially of the canopy, said means being shorter than the fully extended length of the material to which it is connected and serving to hold said material in a loose, unextended condition in a radial direction, and means connected to the canopy adjacent said vent restricting expansion of the vent and serving to hold the material between adjacent radially extending means in a loose unextended condition in a circumferential direction, whereby said means cooperate to reduce the radially and circumferentially directed strains applied to said material when the parachute is in use.

7. A parachute having a canopy with a vent therein, means extending in a radial direction from said vent to the skirt of the canopy and shorter in said direction than the fully extended length of the material of which the canopy is formed, and means connected to said material adjacent the vent restricting expansion of the vent and cooperating with the first mentioned means to maintain said material in loose condition in directions radially and circumferentially of the canopy when the parachute is in use.

8. A parachute having a canopy with a vent therein and suspension lines extending diametrically across said canopy and said vent, the length of the portion of the suspension lines extending across the vent being less than the maximum expanded diameter of the vent, those portions of the suspension lines extended across the canopy being secured throughout substantially the entire length thereof to the material of which the canopy is formed and serving to hold the material between said suspension lines in a loose condition in directions parallel to and transversely of said suspension lines when the parachute is in use.

9. A parachute having a canopy with a vent therein and suspension lines attached to the material of which the canopy is formed, the length of the suspension lines between the vent and skirt of the canopy being less than the corresponding extended length of the material of which the canopy is formed, whereby said material is maintained in a loose condition in directions radially of the canopy, and means attached to the canopy for preventing expansion of said vent to its maximum expanded diameter, whereby the material between the suspension lines is maintained in a loose condition circumferentially of the canopy.

10. A parachute having a canopy formed of material which when fully extended will assume the form of a conical surface with a substantially circular base, and means substantially equal in length to the diameter of said base extending diametrically across the canopy and secured to the material of the canopy whereby the material between said means is maintained in a relatively loose condition radially and circumferentially of the canopy when the parachute is in use.

11. A parachute having a canopy formed of material which when fully extended will assume the form of a conical surface with a substantially circular base, and suspension lines extending diametrically across said canopy and having points thereof spaced apart a distance substantially equal to the length of the diameter of said base, said points being attached to the material of the canopy adjacent the skirt thereof at opposite sides of the parachute whereby the material of said canopy is maintained in a loose condition between said suspension lines when the parachute is in use.

PREVOST F. SMITH.